Feb. 28, 1967   W. H. BUFORD, JR., ET AL   3,306,045
RADIOISOTOPE ROCKET
Filed Dec. 19, 1963   2 Sheets-Sheet 1
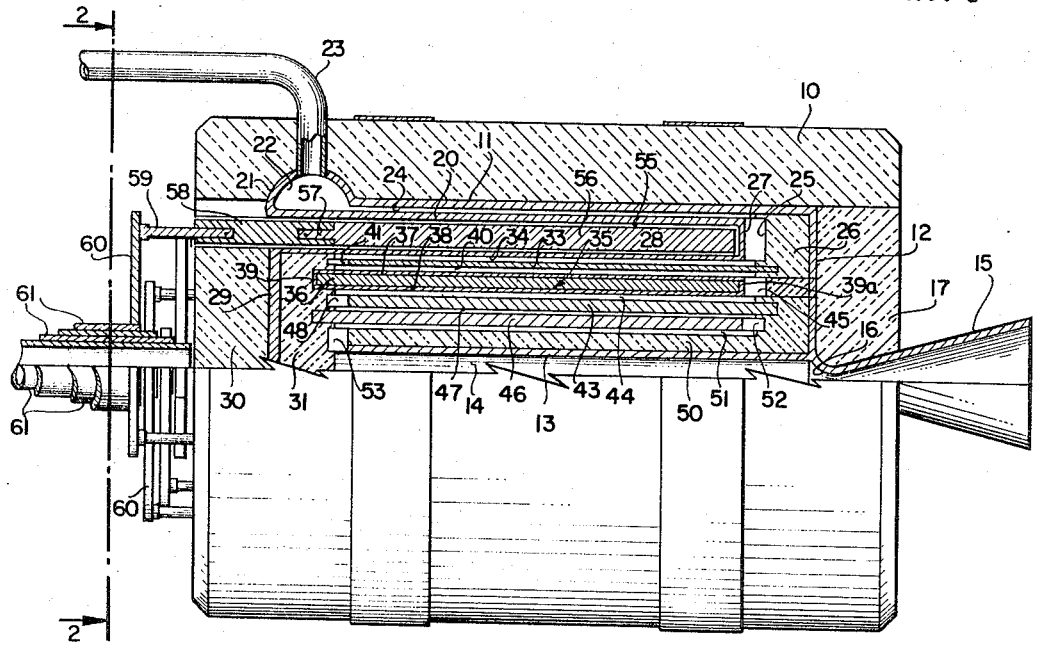
FIG_1
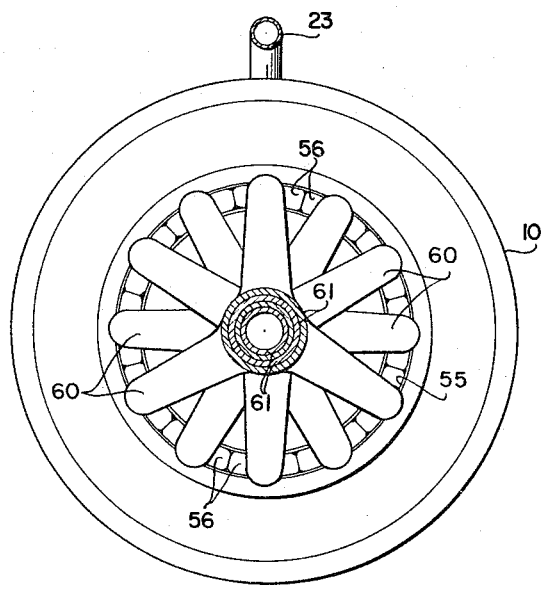
FIG_2
INVENTORS
WILLIAM H. BUFORD, JR.
ARTHUR N. THOMAS, JR.
By R.S. Geangue
Attorney Feb. 28, 1967 W. H. BUFORD, JR., ET AL 3,306,045
RADIOISOTOPE ROCKET
Filed Dec. 19, 1963 2 Sheets-Sheet 2
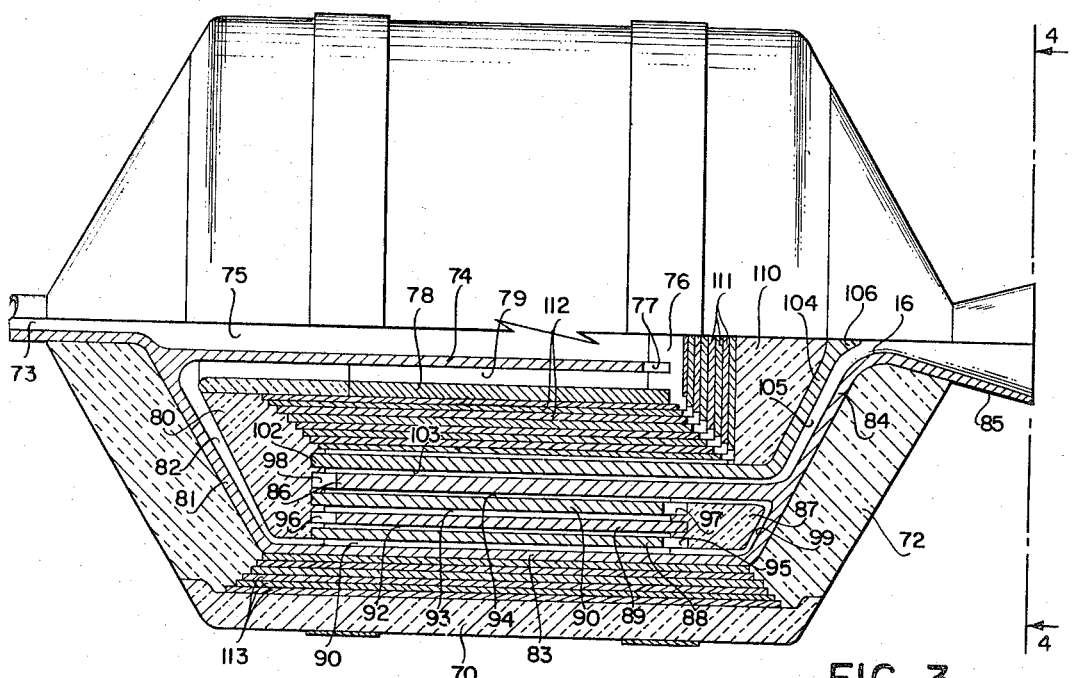
FIG_3
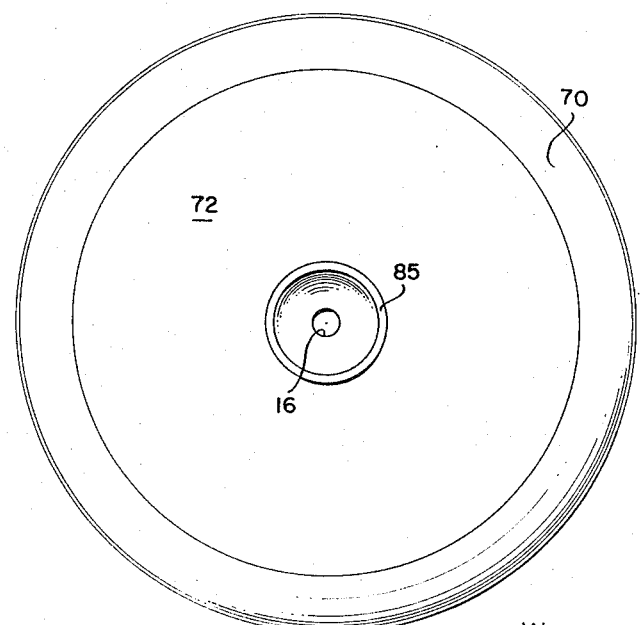
FIG_4
INVENTORS
WILLIAM H. BUFORD, JR.
ARTHUR N. THOMAS, JR.
By R.S. Granger
Attorney ३,३०६,०४५
RADIOISOTOPE ROCKET
William H. Buford, Jr., Granada Hills, and Arthur N. Thomas, Jr., Northridge, Calif., assignors to The Marquardt Corporation, Van Nuys, Calif., a corporation of California
Filed Dec. 19, 1963, Ser. No. 331,877
10 Claims. (Cl. 60—203)

This invention relates to a radioisotope rocket and more particularly to a low thrust rocket in which heating of the exhaust gas is accomplished by the decay energy emitted from a radioisotope source.

Electrical propulsion engines presently under development are characterized by high specific impulses and a low expenditure of propellant material. These engines are, however, limited to a low thrust to weight ratio due to the high specific weight of the electrical power system. Thus, the great payload capability of electrical propulsion devices is accomplished by the requirement of a long mission time. The achievement of reduced mission time for electrically propelled spacecraft can only be achieved by a reduction in the specific weight of the electrical power supply. For instance, a nuclear reactor-electrical power system supplying a few kilowatts must weigh almost as much as one designed for several hundred kilowatts due to the critical size requirements of the reactor.

The present invention provides a low specific weight, high impulse propulsion device capable of use in system missions of shorter time duration. The gamma radiation from the isotope source is used to heat a radiation absorbing material which in turn raises the temperature of the working fluid. The radioisotope rocket must have a specific imuplse of at least 900–1,000 seconds to have an advantage over other propulsion techniques and the exit gas temperature requirements are therefore in the range of 4000° to 4600° F.

If an alpha or beta emitter radioisotope fuel element were employed the energy produced would be absorbed in the fuel element requiring that the fuel element temperature be near 5000° F. Inasmuch as known radioisotope materials cannot withstand a temperature of this magnitude, it is not possible to employ an alpha or beta emitter and provide the specific impulse from 900–1000 seconds. Radioisotopes which emit their energy in the form of gamma radiation are ideally suited since the energy is not absorbed in the fuel element itself but can be absorbed in tungsten plates or cylinders located remotely from the fuel element. Therefore, by appropriate routing of the hydrogen propellant, the fuel element can be maintained at a temperature far below the tungsten element temperature and the final element temperature making a high specific impulse possible. The radioisotopes presently available that satisfy the requirements of the system are high specific activity cobalt 60 and the zirconium 95—niobium 95 isobar chains in gross zirconium fission products.

It is therefore an object of the present invention to provide a radioisotope rocket in which a radioactive source is utilized to supply energy to heat a working fluid passing through the rocket.

Another object of the present invention is to provide a radioisotope rocket which utilizes a gamma ray isotope source to provide gamma rays which are absorbed by heating elements for the working fluid.

Another object of the invention is to provide a radioisotope rocket in which gamma rays are absorbed by tungsten heating elements and the operating fluid, such as hydrogen gas, is heated by flowing over the tungsten elements.

A further object of the invention is to provide a radioisotope rocket which has a high specific impulse and low specific weight and which operates at a high efficiency achieved by the absorption of 95 to 99% of available gamma ray energy emitting from a radioactive source.

These and other objects of the invention not specifically set forth above will become readily apparent from the accompanying drawings and description in which:

FIGURE 1 is a side elevational view, partly in section, of the radioisotope rocket of the present invention showing the fuel element and the tungsten cylinders.

FIGURE 2 is an end elevational view along line 2—2 of FIGURE 1 showing the actuators for moving the plurality of control elements in order to control the temperature of the working fluid.

FIGURE 3 is a side elevational view, partly in sections, of a modification of the present invention in which the fuel element is located at the center of the rocket; and FIGURE 4 is an end elevational view along 4—4 of FIGURE 3 showing the rocket nozzle.

Referring to the embodiment of the invention shown in FIGURE 1, the rocket comprises a cylindrical outer sleeve 10 of suitable insulation material which is partially lined by a cylindrical wall 11 of tungsten. An end disc 12 of tungsten is integral with wall 11 and with an inner cylindrical tungsten member 13 which defines a central chamber 14 for the working fluid. An exit nozzle 15 is integrally formed with member 13 and has a throat 16 communicating with chamber 14 so that high temperature working fluid can be discharged through the nozzle to produce thrust. An end disc 17 of insulating material covers end member 12 and has a central opening shaped to receive a portion of nozzle 15.

A second cylindrical tungsten wall 20 is spaced slightly inwardly from wall 11 and the two walls are connected at end 21 to form a header chamber 22. A passage 23 connects with space 22 and introduces the working fluid to the radioisotope motor. Header 22 communicates with annular space 24 located between the walls 11 and 20 and space 24 connects with end space 25, located between an insulated member 26 and an end wall 27 which connects wall 20 with another cylindrical wall 28. The wall 28 connects with a tungsten end member 29 which is located between an end insulating member 30 and an end insulating member 31. A fixed tungsten cylinder 33 is supported at its ends by the insulating members 26 and 31 and is spaced inwardly from wall 28 to form a flow passage 34 connecting with end passage 25.

The fuel element 35 consists of a radioisotope material 36 which is confined in a coating consisting of tungsten cylinders 37 and 38 closed by ends 39 and 39a. The end 39 of the coating is rigidly supported by the insulating member 31 so that the cylindrical wall 37 cooperates with cylinder wall 33 to provide a flow space 40 communicating with space 34 through end spaces 41 in wall 28. A second fixed tungsten cylindrical element 43 is supported at its ends by the insulating members 26 and 31 and is spaced from cylindrical wall 38 to form a flow passage 44 which communicates with passage 40 through end space 45. A third tungsten cylindrical element 46 has its ends supported in the insulating members 26 and 31 and is spaced from element 43 to form a passage 47 which connects through end spaces 48 with passage 44. Also, the insulating member 26 has a cylindrical projection 50 which is located adjacent cylindrical member 13 and spaced from the third fixed member 46 to provide a flow passage 51 which connects with passage 47 through end spaces 52 in member 49 and the passage 51 discharges to the central chamber 14 through end spaces 53.

The annular space 55 formed by tungsten elements 20, 27 and 28 receives twelve tungsten control elements 56 (see FIGURE 2). The end of each element has a tongue 57 secured to an adapter 58 which also receives a tongue 59 connected with a control actuator arm 60. The actuator arms 60 are connected to one of the four cylinders 61 which are slidable relative to one another to adjust the position of the control elements 56 in space 55. As illustrated in FIGURE 2, three arms 60 are connected to each cylinder and to separate control elements spaced 120° apart around the space 55. Any suitable actuation mechanism can be utilized to position the cylinders 61 so that any selected amount of the control elements will be located within the cavity of 55. Such a mechanism first moves the outer cylinder and then the inner cylinders in succession so that the arms 60 on an inner cylinder will not be stopped by an outer cylinder.

The fuel element preferably consists of a cobalt 60 which generates gamma rays and this radiation is absorbed by the tungsten elements located within the motor, thereby raising the temperature of the tungsten elements. The working fluid which is introduced from passage 23 is heated by the elements during its passage through the various spaces between the elements on its way to central chamber 14. Since the temperature of a tungsten element will depend upon the area of the elements subject to gamma radiation from the fuel element 35, it is apparent that the removal from the motor of a part or all of any of the tungsten control elements 56 will reduce the amount of heat generation produced in the motor by the fuel element 35. Thus, the actuators 61 are used to move the control elements 56 in and out of space 55 to adjust the output level. The remainder of the tungsten structure is fixed so that these elements are always fully subject to the gamma radiation from the fuel element. By adjusting the position of the fuel element, it is possible to provide a 30–40% variation in the total rocket heat generation.

Gaseous hydrogen is used as the working fluid and is introduced under pressure to the manifold 22 from a suitable source. As the hydrogen flows back and forth over the heated tungsten elements, the temperature of the hydrogen is increased to a temperature preferably in the range of about 4600° F. by the time it reaches the central chamber 14. Thereafter, it passes through nozzle 15 and expands to a high velocity to produce the required thrust. In operation, each of the surrounding cylinders act as a gamma radiation shield, and will absorb a portion of the available radiation energy. The energy absorbed in each shield varies with position and thickness of the shield. The heat generation per element is thus regulated by the geometric arrangement of the shield and the source. In one form of the device, the rocket weight can be about 150 lbs. and have a hydrogen coolant flow of $10^{-3}$ lbs./second and will produce a thrust of ⅓ pound with a 10 kilowatt cobalt 60 isotope source. A specific impulse of 1000 seconds is obtainable from such a rocket and the required exit gas temperature is 4600° F. so that the central tungsten layer must operate near 5000° F.

Gamma ray shielding the rocket is not a problem for unmanned space systems since rocket components are not as subject to gamma ray damage as to neutron damage. Temporary shielding will be required before launch to protect ground personnel from gamma radiations and this can be in the form of either gravity-dumped liquid mercury or removable tungsten or lead shield layers around the rocket. The useful lifetime of a rocket is determined by the half-life of the fuel isotope, the evaporation of the tungsten heating element, and the deterioriation of the clad fuel element with operating time. The heating elements can be thick in this system for the gamma ray attenuation and therefore, the evaporation rate will not be a problem. Also, the fuel is designed to operate at a reasonable temperature so that the fuel element will not rapidly deteriorate.

Since exit gas temperature in the region of 4000° to 4600° F. is required for use in the system, low melting temperature isotopes sources are undesirable. The use of alpha or beta radioisotope sources are not practical since these particles, by virtue of the electric charge, interact strongly with the atomic electrons of the matter they pass through, and very quickly loose their energy. Thus, they are stopped in relatively thin layers of material and almost all the energy would be deposited in the fuel element. On the other hand a gamma ray may travel relatively long distances through matter before interactions. Thus, by using a gamma source, the major portion of the energy can escape from the fuel and be absorbed at some distance. Approximately 5%–10% of the radioisotope energy will be allowed to escape from the system, and this fixes the quantity of material needed to attenuate the gamma radiation. The insulation cuts down the thermal radiation losses from the system and these losses will, of course, vary with the propellant flow rate.

The cladding for the fuel element is thin enough to allow substantially all the radiation energy to escape and thick enough to provide structural support at elevated temperatures. The isotope fuel is designed to melt down when the hydrogen flow is discontinued so that re-entry radiation hazards are not a problem.

A modification of the invention is illustrated in FIGURES 3 and 4 wherein the hydrogen first encounters the fuel element before the heating elements. The motor has an external cylindrical insulation member 70 and two conical shaped end insulation members 71 and 72. An inlet passage 73 formed of tungsten passes through end member 71 and enlarges into wall 74 to form a central chamber 75. The end of chamber 75 is closed by an insulation disk 76 which supports the end of wall 74 where it is cut away to form end passages 77. Annular fuel element 78 is located outwardly from wall 74 to form a passage 79 therebetween and the fuel element is located between insulation member 76 and insulation member 80.

An outer tungsten element extends from wall 74 and has a wall section 81 (spaced from the surface of insulation member 80 by space 82), a wall section 83 parallel with outer member 70, and a wall section 84 along the inner surface of insulation member 72. Nozzle 85 is formed integral with section 84 and passes through insulation member 72. A cylindrical tungsten element 86 extends from wall section 84 and forms, with wall section 83 and insulation member 80, a chamber which contains insulation member 87 and three cylindrical tungsten elements 88, 89 and 90 extending between insulation member 80 and 86. Spaces 91 and 92 separate member 88 from wall section 83 and member 89, and spaces 93 and 94 separate member 90 from member 89 and element 86. End openings 95, 96, 97 and 98 in members 88, 89, 90 and 86 connect all the spaces together and space 91 receives the working fluid from space 82. Also, member 87 is surrounded by passage 99 connecting between spaces 91 and 94.

An internal tungsten member has a cylindrical section 102, separated by space 103 from element 86 with one end anchored in insulation member 80. Section 102 is integral with an end conical section 104 separated from a part of wall section 84 by space 105, and section 104 has a dome 106 which serves as a plug for nozzle 85. An insulation member 110 is located adjacent end section 104 and is separated from insulation member 76 by a plurality of thin cylindrical tungsten plates 111. Also, a plurality of cylindrical thin tungsten plates 112 separate wall section 102 from the fuel element 78 and the end of plates 112 are located at insulation member 80. Another plurality of thin tungsten plates 113 extend between insulation members 71 and 72 and separate wall section 83 from insulation member 70. The plates 111, 112 and 113 all serve as thermal shields to minimize heat transfer between flow sections and to prevent outside energy losses. The thin plates minimize gamma ray absorption but are susceptible to vaporization. As in the previous embodiment, a tungsten shell surrounds the isotope material to serve as a structural member.

In operation of the motor of FIGURE 3, the hydrogen gas flows first through chamber 75 and then past fuel element 78. Thereafter, it flows from spaces 82 and 91 successively through spaces 92, 93, 94 and 103 into space 105 leading to the nozzle 85. A portion of the hydrogen can flow directly from space 91 to space 94 through space 99. During this flow, the hydrogen is heated by the tungsten elements which are subject to the gamma radiation from the fuel element and the high temperature hydrogen is discharged through nozzle 85.

The radioisotope rocket of the present invention can assume a variety of configurations. The total number of tungsten elements to be heated by the source and the placement of the fuel source and the heating elements can be varied in accordance with heat transfer considerations and maximum allowable fuel element temperature, and the thickness of the tungsten layer determines the heat generation in each plate. Various other modifications are contemplated by those skilled in the art without departing from the spirit and scope of the invention as hereinafter defined by the appended claims.

What is claimed is:
1. A radioisotope rocket comprising:
   a casing constituted of insulating material;
   a fuel element located within said casing to provide a source of gamma radiation;
   a plurality of heating elements located within said casing for receiving radiation from said fuel element in order to maintain said heating elements at an elevated temperature higher than the temperature of said fuel element;
   said fuel element and heating elements being spaced apart to form a flow path over said fuel and heating elements for a working fluid;
   means for introducing said working fluid to the inlet of said flow path; and
   nozzle means at the exit of said flow path for discharging high temperature working fluid to produce thrust.

2. A radioisotope rocket comprising:
   a casing consisting of insulating material;
   a fuel element located within said casing to provide a source of gamma radiation;
   a plurality of heating elements comprising cylindrical members of different diameters located within said casing for receiving radiation from said fuel elements in order to maintain said heating elements at an elevated temperature;
   said fuel element comprising a cylindrical member interposed between two of said heating elements and being spaced apart from said heating elements to form a flow path over said fuel and heating elements for a working fluid;
   means for introducing said fluid to the inlet to said flow path; and
   nozzle means at the exit of said flow path for discharging high temperature working fluid to produce thrust.

3. A radioisotope rocket as defined in claim 2 wherein said fuel elements consist of cobalt 60.

4. A radioisotope rocket as defined in claim 2 wherein said working fluid is hydrogen gas.

5. A radioisotope rocket as defined in claim 2 wherein said flow path comprises annular spaces between said fuel and heating elements connected at alternate ends to one another.

6. A radioisotope rocket as defined in claim 5 wherein said inlet is located at the outer diameter of said flow path and said exit is located at the inner diameter of said flow path.

7. A radioisotope rocket as defined in claim 5 wherein said inlet is located at the inner diameter of said flow path and said exit is located at an intermediate diameter of said flow path.

8. A radioisotope rocket as defined in claim 2 wherein said fuel element comprises a cylindrical member of cobalt 60 clad in tungsten sheet.

9. A radioisotope rocket as defined in claim 2 wherein one of said heating elements comprises a cylindrical member having separate segments movable into and out of said casing to control the temperature increase of said working fluid.

10. A radioisotope rocket as defined in claim 2 wherein one of said heating elements comprises a cylindrical member divided into a plurality of segments;
   an annular shell of tungsten slidably supporting said segments and open at one end of said casing; and
   actuator means for selectively positioning said segments in said shell to control the heating action of said segments.

References Cited by the Examiner
UNITED STATES PATENTS

| | | | |
|---|---|---|---|
| 2,765,414 | 10/1956 | Gendler et al. | |
| 2,894,891 | 7/1959 | Grebe. | |
| 3,087,451 | 4/1963 | Chandler | 60—35.5 |
| 3,108,054 | 10/1963 | Blackman | 176—39 X |
| 3,127,319 | 3/1964 | Natland | 176—39 X |

OTHER REFERENCES

Progress in Astronautics and Rocketry, Space Power Systems, by Nathan W. Snyder, vol. 4 (1961), pp. 504–515.

REUBEN EPSTEIN, *Primary Examiner.*